United States Patent
Marinelli

(10) Patent No.: US 6,247,651 B1
(45) Date of Patent: *Jun. 19, 2001

(54) COMPOSITE RAILWAY CROSSTIE, SHAPED LIKE AN I BEAM

(76) Inventor: John Marinelli, 3407 Oak Alley Ct. #503, Toledo, OH (US) 43606

( * ) Notice: Subject to any disclaimer, the term of this patent is extended or adjusted under 35 U.S.C. 154(b) by 0 days.

This patent is subject to a terminal disclaimer.

(21) Appl. No.: 09/522,801

(22) Filed: Mar. 10, 2000

Related U.S. Application Data

(63) Continuation-in-part of application No. 09/128,108, filed on Aug. 3, 1998, now abandoned, which is a continuation-in-part of application No. 09/080,359, filed on Jan. 12, 1998, now Pat. No. 6,007,269, which is a continuation-in-part of application No. 08/744,547, filed on Nov. 6, 1996, now abandoned.

(51) Int. Cl.$^7$ ........................................................ E01B 9/00
(52) U.S. Cl. .............................................. 238/84; 238/85
(58) Field of Search .................................. 238/29, 57, 83, 238/84, 85, 66, 54, 65, 88, 94, 90, 91; 404/6

(56) References Cited

U.S. PATENT DOCUMENTS

| | | | | |
|---|---|---|---|---|
| 1,005,992 | * | 10/1911 | Ault | 238/83 |
| 1,105,319 | * | 7/1914 | Baltz | 238/83 |
| 4,083,491 | * | 4/1978 | Hill | 238/54 |
| 5,238,734 | * | 8/1993 | Murray | 238/83 |
| 5,609,295 | * | 3/1997 | Richards | 238/85 |
| 5,722,589 | * | 3/1998 | Richards | 238/85 |
| 5,916,932 | * | 6/1999 | Nosker et al. | 238/84 |

* cited by examiner

Primary Examiner—Mark T. Le

(57) ABSTRACT

A railway crosstie is adapted for use in a track system having a pair of rails supported on longitudinally spaced crossties. The railway crosstie includes an I-beam member made of a combination of recycled materials.

1 Claim, 1 Drawing Sheet

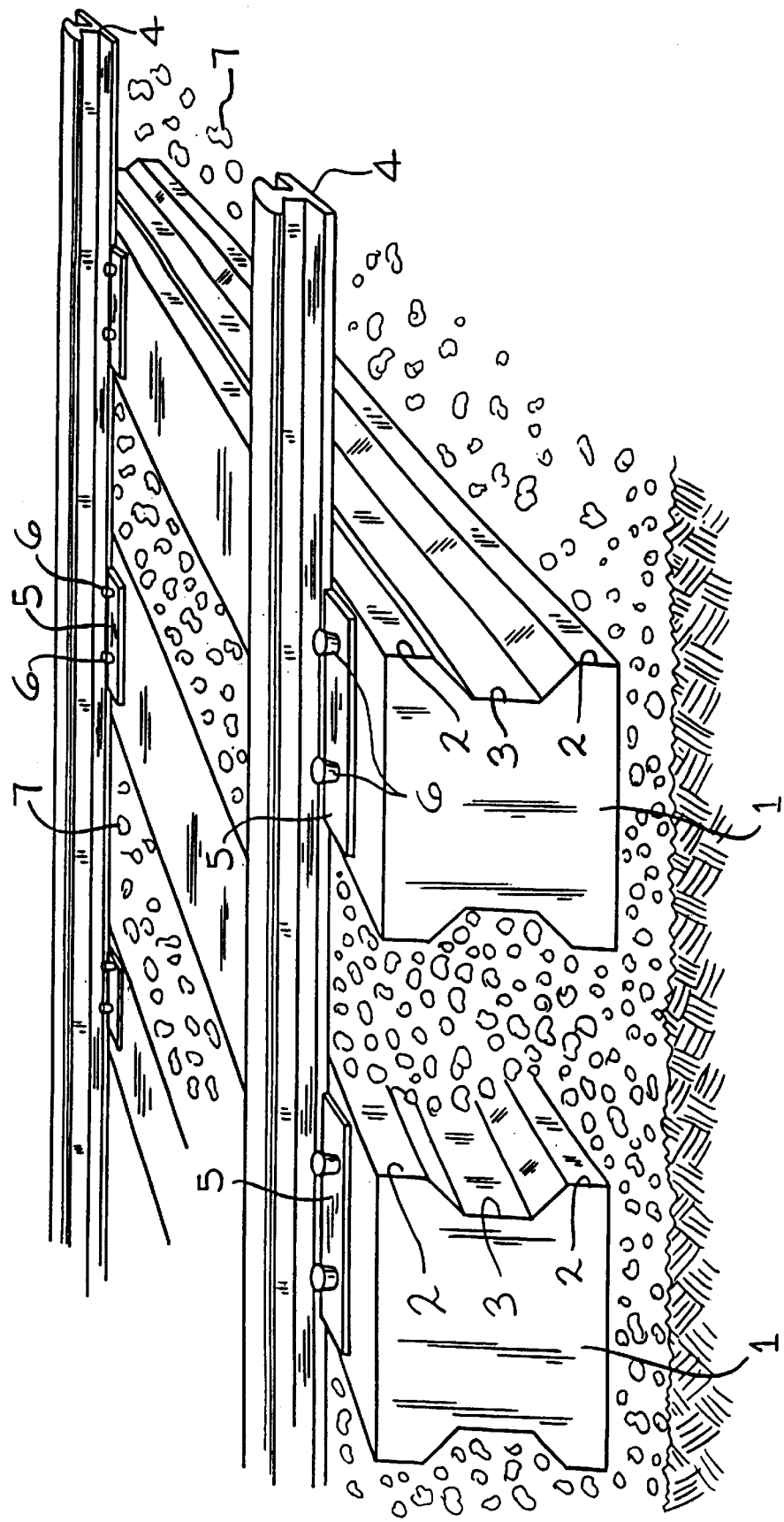

COMPOSITE RAILWAY CROSSTIE, SHAPED LIKE AN I BEAM

This is a continuation-in-part application of U.S. patent application Ser. No. 09/128,108, filed on Aug. 3, 1998, now abandoned; which is a continuation-in-part application of U.S. patent application Ser. No. 09/080,359, filed on Jan. 12, 1998, now U.S. Pat. No. 6,007,269; and which is a continuation-in-part application of U.S. patent application Ser. No. 08/744,547, filed on Nov. 6, 1996, now abandoned.

BACKGROUND OF THE INVENTION

1. Field of the Invention

The invention relates to a composite I beam shaped railway or railroad crossties.

2. Description of the Prior Art

Ninety-three percent (93%) of the railway crossties produced today are made of treated wood timbers. These timbers are 229 mm wide by 178 mm high and generally 259.2 cm long.

The treatment used in the wood crossties can be creosote, chromated copper arsenic and other chemicals that are harmful to the environment. When the rain, snow and associated weather conditions impacts on the crossties that are placed on a stone ballast roadbed, these chemicals migrate into the surrounding soil and are having a harmful effect on the environment. The sun and weather also has an evaporative effect on the chemical treatment of the wood crossties. As this evaporation process of the chemicals continues, the cellulose wood fibers are exposed and this condition leads to the degradation of the wood crossties.

Normally the real time service life of a treated wood crosstie is about thirteen years. However there are many wood crossties in place that are beyond this real time service life. These older wood ties are spliting, cracking, cannot hold a cut spike (fastener), generally are rotting away, leaching harmful chemicals into the soil, and are causing derailments.

When taken out of service, the disposal of treated wood ties causes another environmental problem. Many of the states Environmental Protection Agencies will not allow creosoted wood ties to be burned or incinerated because of the emission of toxic fumes. The acid treated wood ties can be granulated and buried, but this presents a polluted soil condition. The object of our invention is to produce a composite crosstie to have a real time service life of sixty (60) to seventy (70) years, and not have the pollution and degrading properties of a treated wood tie.

The object of this invention is to produce a composite crosstie that will have a long real time service life, is inert and friendly to the environment, and will have an end use product of recycled material that is now going into landfills, or is shipped offshore.

SUMMARY OF THE INVENTION

The above objects of the invention may be readily achieved by providing a railway crosstie in the form of an I-beam made of a combination of recycled materials.

BRIEF DESCRIPTION OF THE DRAWING

The above objects and advantages of the invention may be readily apparent to one skilled in the art from reading the following detailed description of an embodiment of the invention when considered in the light of the accompanying drawing that shows a perspective view of a railway system illustrating the use of the railway crosstie of the present invention.

DETAILED DESCRIPTION OF THE PREFERRED EMBODIMENT OF THE INVENTION

Referring to the drawing, a fragmentary perspective view, there is disclosed a composite I beam shaped railway crosstie 1, with spaced apart flanges 2, and an interconnecting center web section 3.

It has been found that satisfactory results can be achieved by forming the stock for making the composite crossties from a material made of recycled post-consumer/post-industrial waste polyolefins, scrapped rubber tires, and waste glass fibers. The constituents of the composite crosstie 1, is of recycled high density polyethylene and polypropylene plastics (65%), scrapped and granulated rubber tires (20%), and screener waste glass fibers (15%).

These constituents are first mixed together, then processed through an extruder where they are heated to approximately 300° F. and compounded, then forced through a suitably configured extrusion die to form an I beam shape with spaced apart flange sections 2, and an interconnecting center web section 3. As the continuous length product exits the extruder die and is cooled, the molten plastic which acts as the primary bonding agent, firmly bonds the substituents into a unitary formed product. After it is cooled to room temperature, this continuous extrudate is then cut to lengths of 259.2 cm.

The product is now ready for a long and useful service life as a composite railway crosstie, rather than this waste material burdening the landfills, or shipped offshore.

The tieplates 5 are used on the crossties to provide a larger footprint than the bottom flange of the track rails 4 and thus minimize rail abrasion on the crossties, and fasteners 6 are provided for securing the rails and tie plates to the crossties.

In accordance with the provisions of the patent statutes, the present invention has been described in what is considered to represent its preferred embodiment. However, it should be understood that the invention can be practiced otherwise than specifically illustrated and described without departing from its spirit or scope.

What is claimed is:

1. A railway crosstie for supporting a pair of railway rails, comprising: an I-beam member having opposed longitudinally extending parallel flange sections and an interconnecting coextensive center web of a smaller width dimension than a width dimension of the flange sections, and said I-beam member being formed of a composite of 65% recycled plastic, 20% crumb rubber, and 15% reinforcing fibers.

* * * * *